E. P. BAIRD.
REGISTER AND DEVICE ASSOCIATED THEREWITH.
APPLICATION FILED JULY 11, 1902.

908,375.

Patented Dec. 29, 1908.
6 SHEETS—SHEET 1.

Witnesses:
Emma Gerlach
Alberta Adamick

Inventor:
Edward P. Baird
By Fred Gerlach
his Attorney

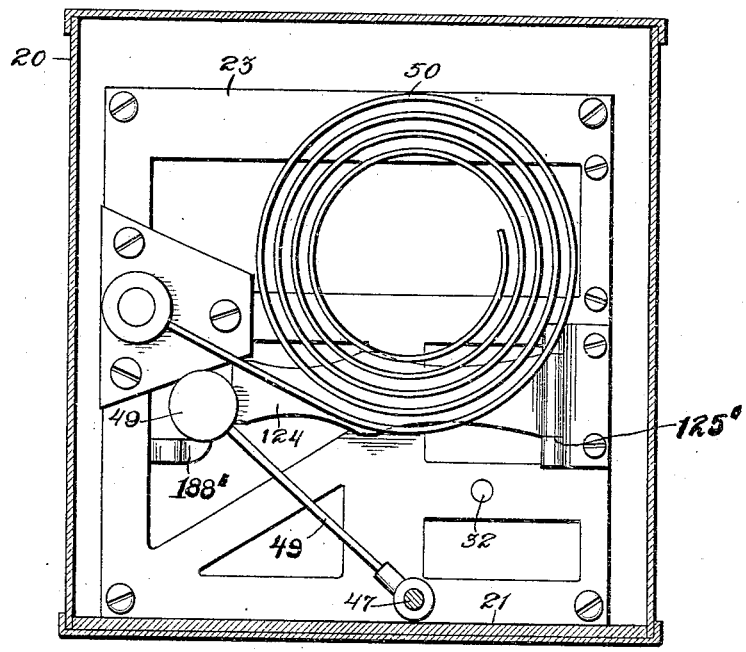
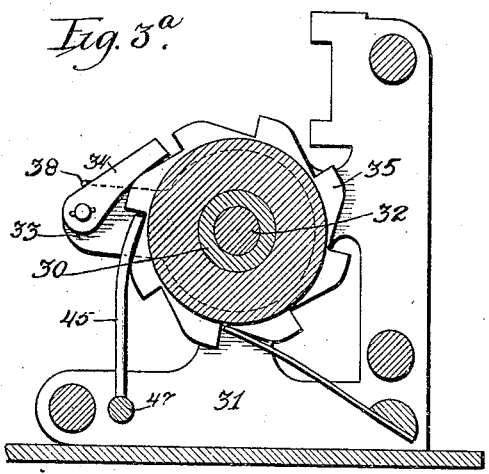
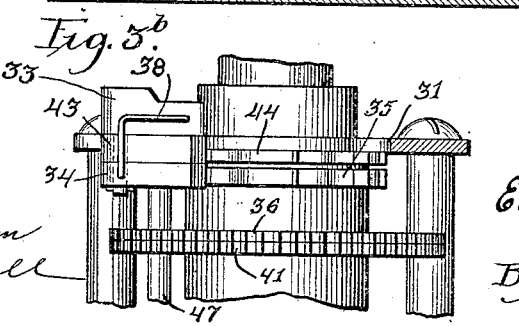

E. P. BAIRD.
REGISTER AND DEVICE ASSOCIATED THEREWITH.
APPLICATION FILED JULY 11, 1902.
908,375.
Patented Dec. 29, 1908.
6 SHEETS—SHEET 3.
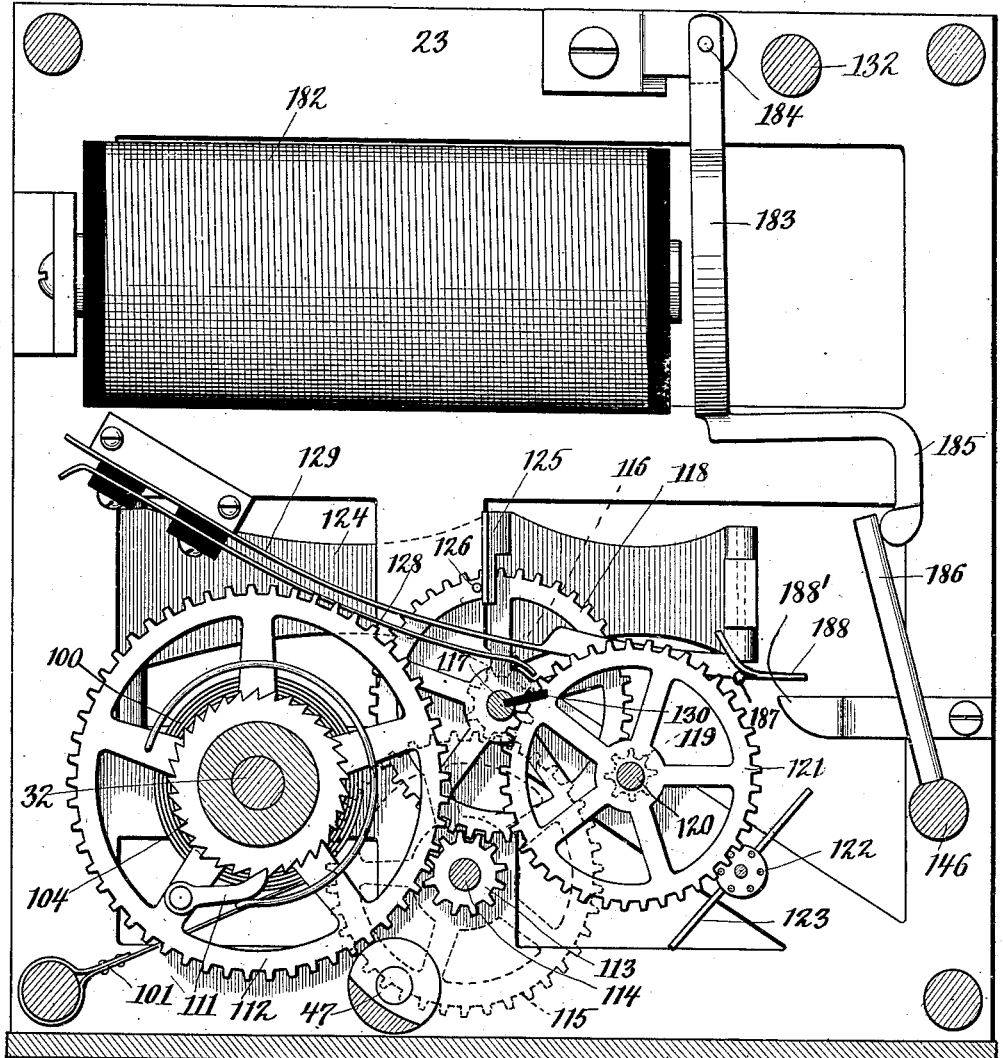
Fig. 5.   Fig. 4.
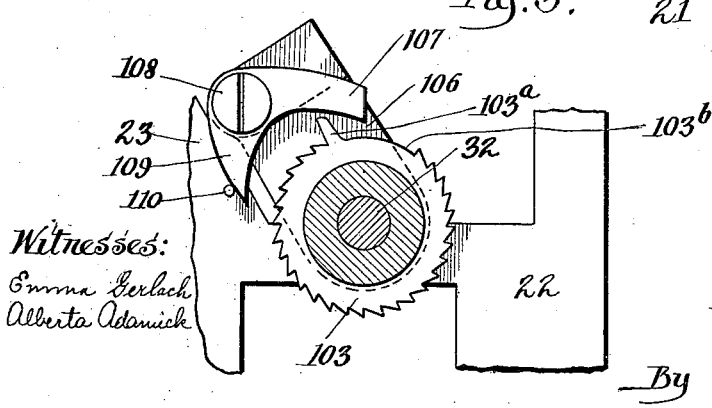
Witnesses:
Emma Gerlach
Alberta Adamick
Inventor:
Edward P. Baird
By Fred Gerlach
his Attorney.

E. P. BAIRD.
REGISTER AND DEVICE ASSOCIATED THEREWITH.
APPLICATION FILED JULY 11, 1902.

908,375.

Patented Dec. 29, 1908.
6 SHEETS—SHEET 4.

Witnesses:
Emma Gerlach
Alberta Adamick

Inventor:
Edward P. Baird
By Fred Gerlach
his Attorney.

E. P. BAIRD.
REGISTER AND DEVICE ASSOCIATED THEREWITH.
APPLICATION FILED JULY 11, 1902.
908,375.
Patented Dec. 29, 1908.
6 SHEETS—SHEET 5.
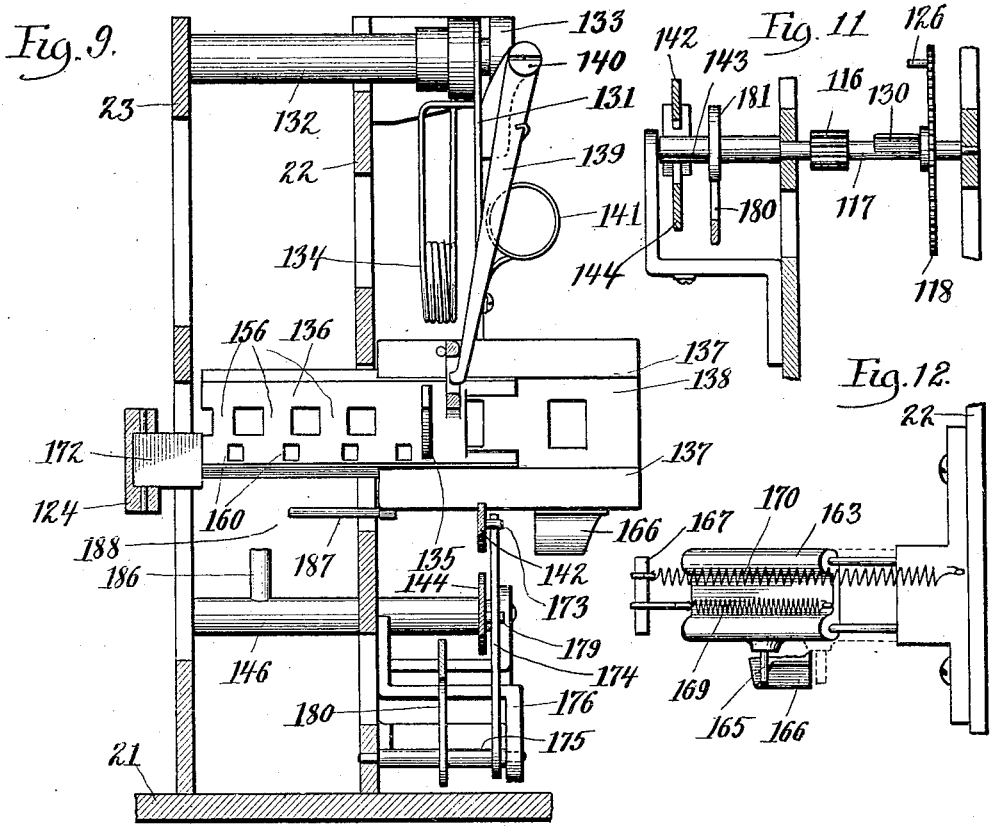
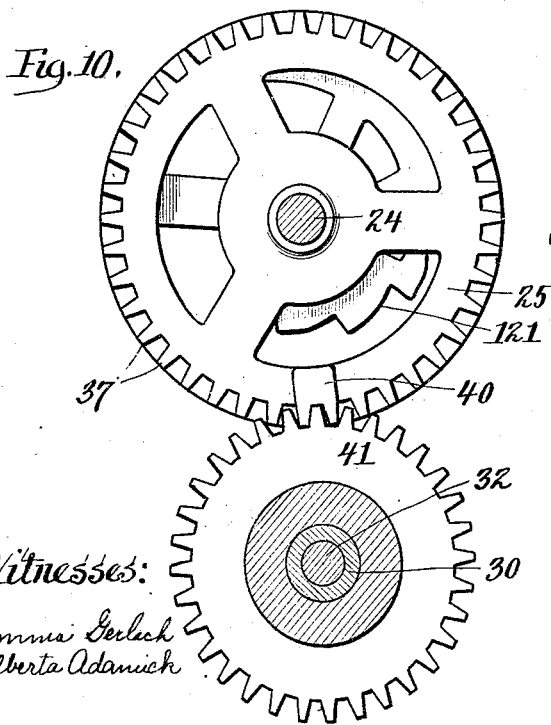
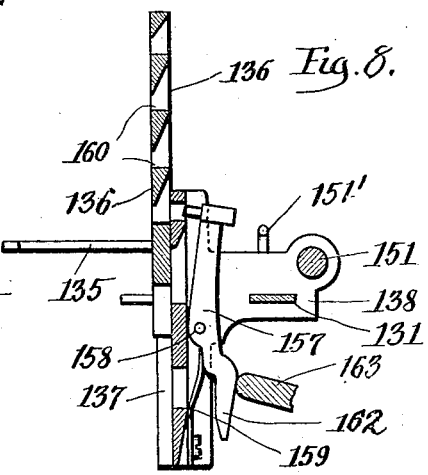
Witnesses:
Emma Gerlach
Alberta Adamick
Inventor:
Edward P. Baird,
By Fred Gerlach
his Attorney.

E. P. BAIRD.
REGISTER AND DEVICE ASSOCIATED THEREWITH.
APPLICATION FILED JULY 11, 1902.

908,375.

Patented Dec. 29, 1908.
6 SHEETS—SHEET 6.

Witnesses:
Alberta Adamick
Emma Gerlach

Inventor
Edward P. Baird
By Fred Gerlach
his Attorney.

UNITED STATES PATENT OFFICE.

EDWARD P. BAIRD, OF EVANSTON, ILLINOIS, ASSIGNOR TO BAIRD MANUFACTURING COMPANY, OF CHICAGO, ILLINOIS, A CORPORATION OF ILLINOIS.

REGISTER AND DEVICE ASSOCIATED THEREWITH.

No. 908,375.  Specification of Letters Patent.  Patented Dec. 29, 1908.

Application filed July 11, 1902. Serial No. 115,110.

*To all whom it may concern:*

Be it known that I, EDWARD P. BAIRD, a resident of Evanston, in the county of Cook and State of Illinois, have invented certain new and useful Improvements in Registers and Devices Associated Therewith, of which the following is a full, clear, and exact description.

The invention relates to registering-devices, *e. g.*, those employed for indicating the number of calls made at a substation of a telephone system, and to devices associated therewith for transferring the record indicated by the register to a distant or central station.

The invention designs to provide transmitting mechanism for transferring the record of a denominational register at a substation to a central exchange or distant station so that the indicator or counter for the different denominations will be successively transmitted in groups of units, one group for each denomination.

The invention further designs to provide improved means for transmitting the record of a register, which may be repeatedly operated without destroying the recorded total.

The invention further designs to provide improved registering and transmitting mechanism whereby the record indicated by the register may be transferred to a central office or distant station.

Figure 1:
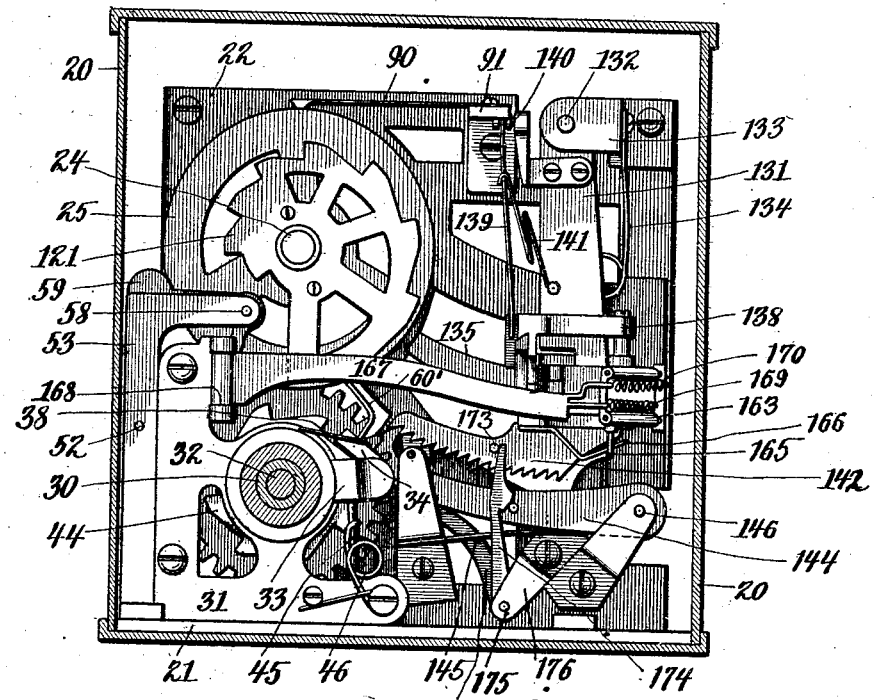
Figure 2:
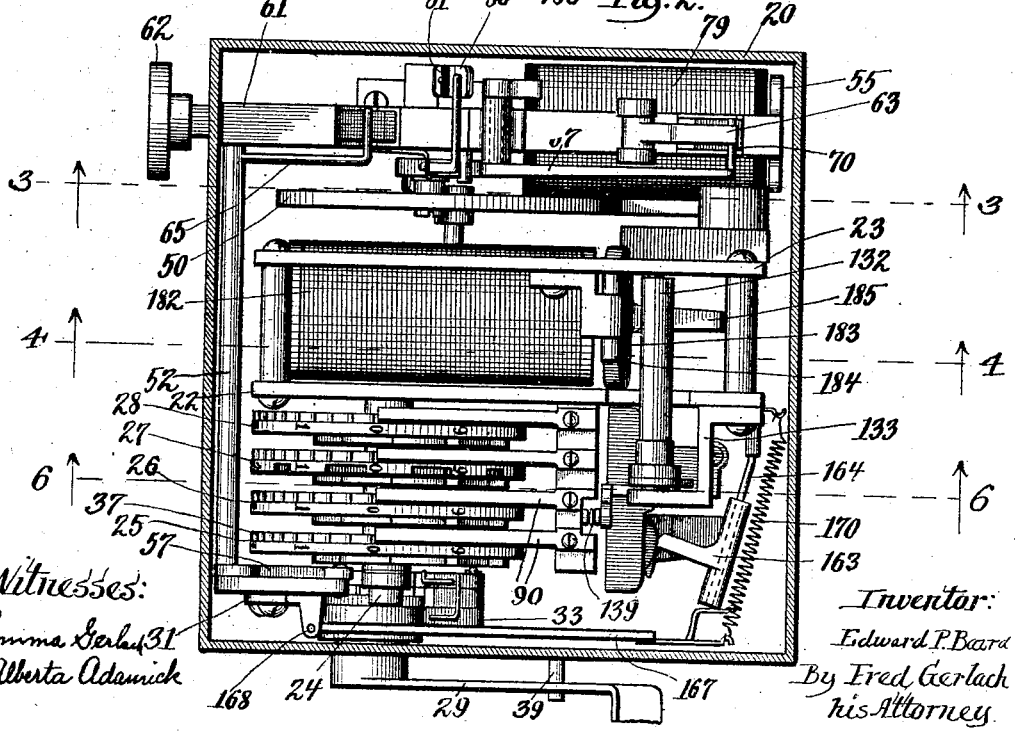
Figure 6:
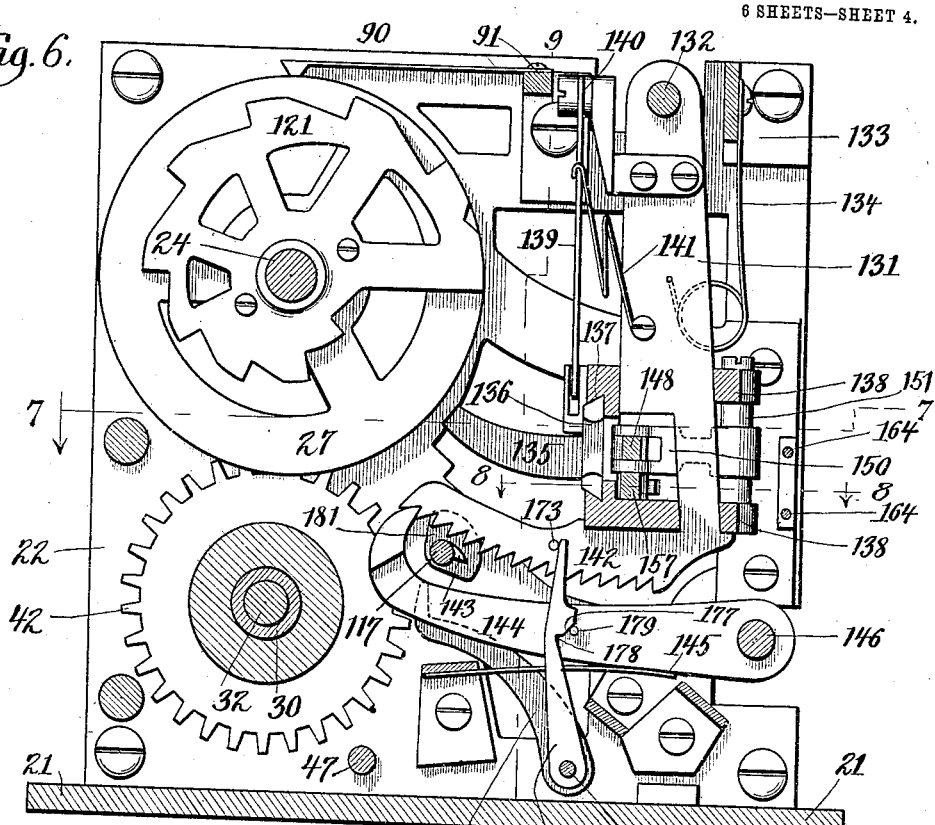
Figure 7:
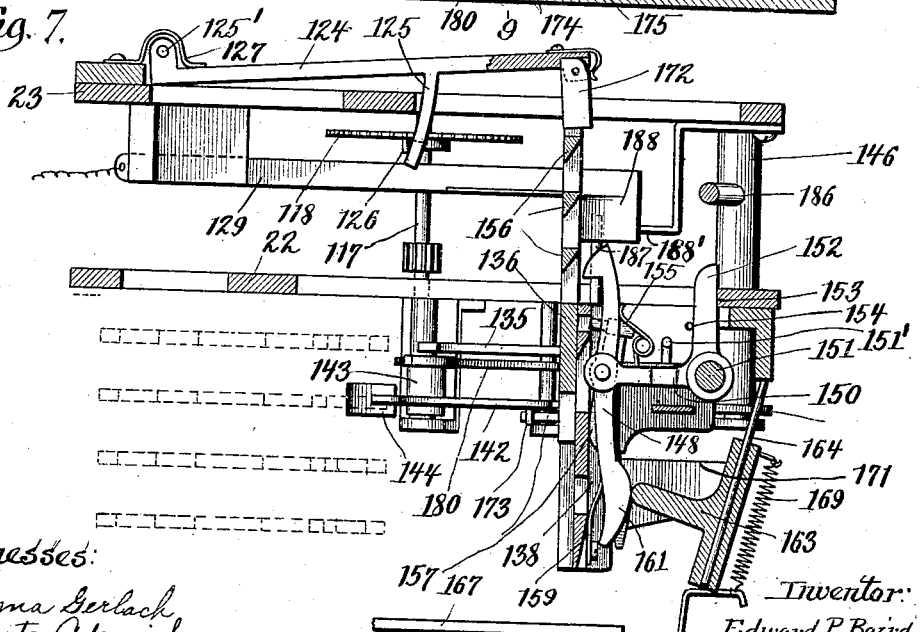
Figure 13:
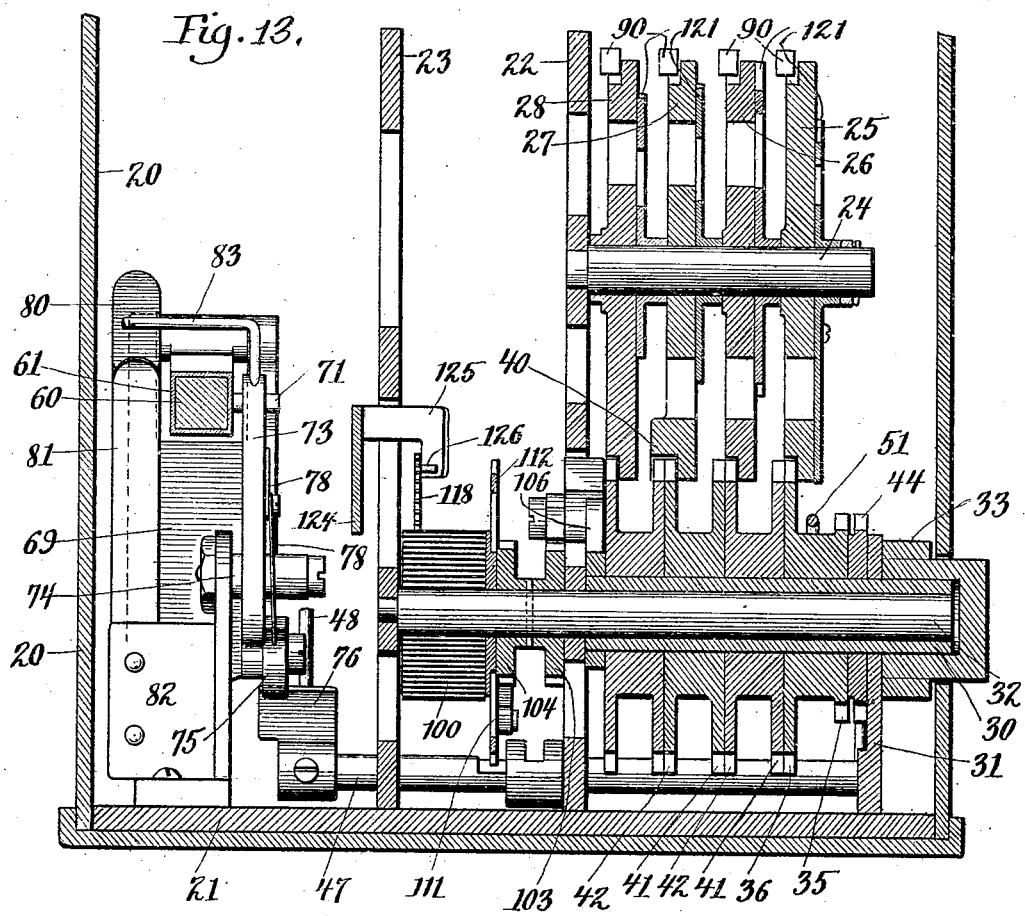
Figure 14:
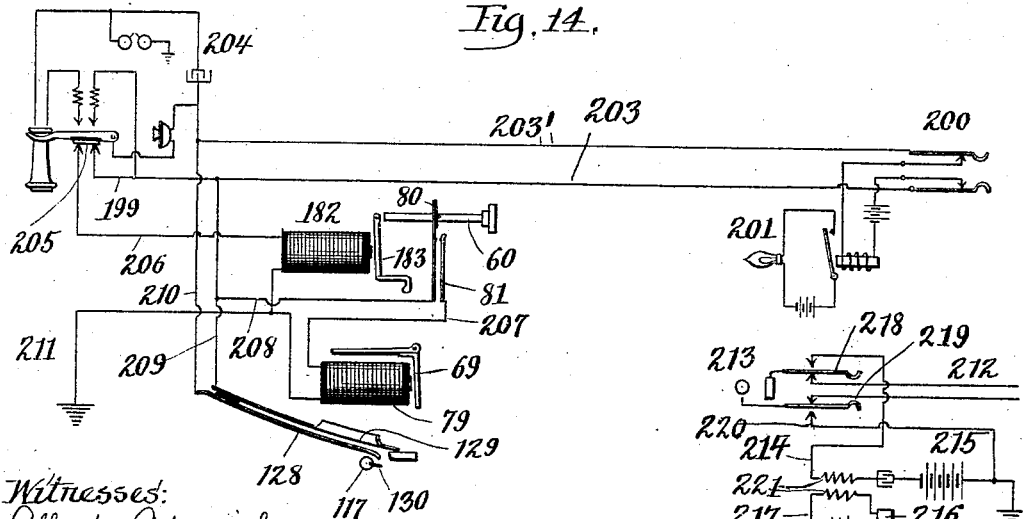

In the drawings: Figure 1 is a view in side elevation of a device embodying the invention, the inclosing casing being shown in section. Fig. 2 is a plan view, the inclosing case being shown in section. Fig. 3 is a section on line 3—3 of Fig. 2. Fig. 3ª is a detail section of the device for advancing the register step-by-step and for actuating the device for producing an audible signal. Fig. 3ᵇ is a plan of the device shown in Fig. 3ª. Fig. 4 is a view in vertical transverse section taken on line 4—4 of Fig. 2. Fig. 5 is a detail view partly in section and partly in elevation of the mechanism for winding the spring motor for operating the transmitting mechanism. Fig. 6 is a view upon an enlarged scale in vertical transverse section, taken on line 6—6 of Fig. 2. Fig. 7 is a detail view in horizontal section, taken on line 7—7 of Fig. 6, parts being omitted. Fig. 8 is a detail view in horizontal section taken on line 8—8 of Fig. 6. Fig. 9 is a view in vertical longitudinal section taken on line 9—9 of Fig. 6. Fig. 10 is a detail view showing one of the indicator wheels of the register and the wheel for carrying movement to the indicator-wheel for the next higher denomination. Fig. 11 is a detail view in vertical longitudinal section showing the drive-shaft and parts connected thereto. Fig. 12 is a detail view of the sliding releasing-shoe for the pawls engaging the finger-carrier. Fig. 13 is a view in vertical transverse section, taken through the indicator wheels. Fig. 14 is a diagrammatic view of a telephone system having the improved registering-device and transmitting-mechanism associated therewith.

The registering-device and transfer-mechanism are located at a substation and are usually inclosed in a case 20 of any suitable construction. For convenience in construction, the several parts of the device are sustained upon a base-plate 21 and by a frame comprising vertical members 22 and 23. A shaft or stud 24 is secured in frame-member 22 and on said shaft are journaled indicator-wheels in desired number. Four indicator-wheels 25, 26, 27 and 28 are provided for indicating respectively, units, tens, hundreds and thousands. The numerals are indicated on the periphery of each wheel, and it will be understood that a sight-opening (not shown) will be provided at any convenient place, so the record indicated by the register may be ascertained at the station where the register is located. Each of the indicator-wheels is held in position by a spring-detent 90 secured to a bracket 91 (see Figs. 2, 6, and 13). The mechanism for advancing the register step-by-step comprises an actuating-lever 29 arranged outside of the case, (see Fig. 2) so it can be manually shifted, and which is rigidly secured to a sleeve 30, journaled in a fixed-bracket 31 and on a shaft 32 (see Fig. 17). A crank-arm 33, (see Fig .1), is rigidly secured to actuating-lever 29, and a pawl 34 is pivotally secured to the free end of arm 33. Pawl 34 is adapted to successively engage the teeth of a ratchet-wheel 35, which is rigidly secured or integrally formed with a gear-wheel 36, meshing with gear-teeth 37 of indicator-wheel 25. A spring 38, holds pawl 34 normally in engagement with ratchet-wheel 35. The throw of actuating-lever 29 is limited by suitable stops 39, so that during each shift of the actuating-lever, the pawl 34 will advance ratchet-wheel 35, a sufficient distance to advance indicator-wheel 25 one step and to expose the succeeding numeral thereon. Each indicator-wheel is provided with a projecting-tooth 40, which is adapted to engage a gear-wheel 41 rigidly secured or integrally formed with a gear-wheel 42, engaging gear-teeth 37 of the next indicator-wheel of the series, and to advance said gears one step and impart a corresponding shift to the next indicator-wheel. Intermittent movement will be thus imparted from indicator 25 to 26, and from each of the several indicators to the indicator for the next higher denomination in similar manner, and by similar means. Gear-wheels 36 42 and 41 and ratchet-wheel 35 are loosely mounted upon sleeve 30, and are free to revolve independently of the sleeve.

When the registering-device is associated with a telephone system to record the number of "calls", the subscriber actuates the lever 29 after the central operator has responded to the "call". The central operator is informed of the actuation of the registering-device and the advance thereof, by a mechanism for producing an audible signal, which is simultaneously actuated with said device. Said signaling-mechanism comprises a pawl 43, (see Fig. 7) pivotally sustained at the distal end of crank-arm 33 and adapted to successively engage the teeth of a tappet-wheel 44, which is loosely mounted on sleeve 30 and said arm advances said tappet one step for each operation of lever 29. An arm 45 is normally held in engagement with tappet 44 by a spring 46 (see Fig. 1) which holds said arms normally in position to be shifted by tappet 44 and restores said arm to normal position after each actuation of the signaling-device. Arm 45 is secured to a transverse rod or shaft 47, which extends to the opposite side of the device. Rod 47 is journaled in frame-members 22 and 23, and is provided with a striker-lever 48, having a striker 49 adapted to engage and vibrate a gong or other sound-producing body 50, (see Fig. 3).

The operation of the mechanism thus far described, will be as follows: A patron desiring telephone-service, will communicate with the central office in the usual manner. When that has been done, the patron is directed to "register", by pulling the actuating-lever 29 forward. Such forward shift will rock arm 33, and cause pawls 34 and 43 to advance ratchet-wheel 35 and cause a corresponding rotation of the gear-wheel 36, to correspondingly shift indicator 25. After each complete revolution of each of the indicators, the indicator for the next higher denomination will be advanced one step through the medium of gear-wheels 41 and 42. Simultaneously with the shift of ratchet-wheel 35, pawl 43 will advance tappet 44 one step and such shift will cause one of the teeth thereof to rock arm 45 against the force of spring 46. During the latter part of the advance of tappet 44, arm 45 will be released from the tooth, and spring 46 will quickly shift arm 45, striker-lever 48 and striker 49, so as to cause the striker to engage and vibrate gong 50, and thus produce an audible signal. The apparatus is usually secured to the back-board of a telephone-set, so audible signals produced in the apparatus will be clearly conducted by the transmitter of the telephone and the telephone-line, to the operator at the central office. Such signal informs the central operator that the register has been actuated to record the call.

The invention designs to provide improved means for transmitting the record indicated by the register to a remote or distant office, e. g., if the register is employed to record the number of telephone-calls, and is located at a substation of a telephone-system, then the improved means are used to transmit the record indicated by the register to a central station. In heretofore proposed devices for this purpose, it has been necessary to provide a recording-instrument at the station whereby the record was to be received, and the construction of the mechanism was such that when the record indicated by the register was transferred the register was restored to the starting point. The present invention designs and purposes to provide means whereby the record indicated by the register may be transmitted independently of the actuation of the register or without restoring the register to the starting-point. This resultant advantage is important because no controversy can arise in regard to the record indicated by the register at the time a reading is made, and moreover, if necessary, the record can be transmitted a number of times, so as to confirm the first reading if desired.

Movement is preferably (though not essentially) imparted to the transmitting-mechanism by a mechanical motor located at the substation, and which is wound by the operation of the register. In the embodiment of the invention shown, 100 denotes, (see Figs. 4 and 13), a convolute spring having one of its terminals secured to the frame as at 101. The inner terminal of said spring is secured to shaft 32, which is advanced step-by-step with the register, and effects the winding of the motor. Ratchet-wheels 103 and 104 are rigidly secured to shaft 32 (see Fig. 13), and a gear-wheel 112 journaled on shaft 32, imparts movement to a gear-train for operating the transmitting-mechanism. Ratchet-wheel 103 revolves shaft 32 and winds the motor-spring. An arm 106 (see Figs. 5 and 13) is rigidly secured to sleeve 30 whereto actuating-lever 29 is secured. Said arm has pivotally secured thereto, as at 108, a dog 107. Said dog is adapted to engage the teeth of ratchet-wheel 103, and advance said gear-wheel a part of a revolution during each forward shift of the actuating-lever and sleeve 30. An abutment 109 of dog 107 normally engages an abutment 110, which holds said dog normally disengaged from ratchet-wheel 103, to permit said ratchet-wheel to revolve when the transmitting-mechanism is being driven by motor-spring 100. The periphery of ratchet-wheel 103 is formed with a plain surface 103$^b$, arranged in the path of travel of dog 107 when the motor-spring has been sufficiently wound to operate the transmitting-mechanism the desired number of times. Resultantly shift of the ratchet-wheel 103 by the actuating-lever 29, to wind up motor-spring 100 will there be discontinued when positioned so pawl 107 will travel over the plain peripheral portion of ratchet-wheel 103. It will thus be clearly seen that when the motor has been sufficiently wound, to effect the desired number of operations of the transmitting mechanism, the further winding of the motor by the actuating-lever will be automatically discontinued. A projecting tooth 103$^a$ of ratchet-wheel 103 engages dog 107 and prevents the excessive unwinding of the motor.

Movement is imparted from motor-spring 100 to a gear-train, which imparts movement to the several parts of the transmitting-mechanism by shaft 32, and ratchet-wheel 104. Ratchet-wheel 104 (see Fig. 4), is engaged by a spring-pressed pawl 111, carried by gear-wheel 112. Movement is imparted from gear-wheel 112, as follows: pinion 113, shaft 114, secured to said pinion, gear-wheel 115, (see dotted lines Fig. 4), and a pinion 116 secured to a drive-shaft 117, which serves to impart movement to the several parts of the transmitting-mechanism. Movement is also imparted from gear-wheel 118, to pinion 119, shaft 120, gear-wheel 120', and pinion 122, whereto a fly 123 is secured. Fly 123 governs the speed of the motor. The operation of the motor is controlled by a brake-lever 124, pivotally sustained as at 125' (see Figs. 4 and 7), and provided with an abutment 125 arranged to move into the path of a stop-pin 126 carried by gear-wheel 118. A spring 127 presses the brake-lever normally into position to bring abutment 125 into the path of movement of stop-pin 126. When the brake-lever is in position seen in Fig. 11, the gear-train and parts driven thereby, will be secured against revolution.

The signaling-device for transmitting the record indicated by the register to a remote office, or to the central exchange, comprises two spring-contacts 128 and 129, (see Fig. 4), normally out of contact and insulated from each other. A block 130 of insulated material is secured to drive-shaft 117 and engages contact 128 during each revolution of shaft 117 and causes contact of the spring-contacts 128 and 129 to be made and completes the signal-circuit in which these contacts are included. Such mechanism is designed to transmit electrical impulses over the signal-circuit and constitutes a make-and-break mechanism for said circuit.

The operation of the motor and the number of revolutions of shaft 117 and of the contacts made during each operation of the transmitting-mechanism is dependent upon the mechanism presently to be described. A stop 188' restricts the downward movement of contact-spring 129 to insure separation of the contact-springs. The signal-circuit is normally open at these contacts and abutment 130 is normally out of engagement with contact-spring 128.

Each of the indicator-wheels 25, 26, 27 and 28 is provided with a cam 121, (see Figs. 6 and 13) having a series of steps thereon, corresponding to the numerals indicated on each periphery of each indicator. These cams revolve with the indicator-wheels and serve to control the actuation of the signaling-device in such manner, that the signaling-device will be operated in accordance with the numerals indicated thereby.

The mechanism for controlling the operation of the transmitting-device, so that the resultant actuation thereof will correspond with the numerals indicated by the register, comprises a carrier 131, (see Fig. 6) pivotally sustained by a shaft 132, journaled in frame 23 and in a bracket 133. Said carrier is pressed normally towards the indicator-wheels by a spring 134 and is held in normal position shown in Fig. 10, by mechanism presently described. A finger 135 is secured to a slide 136, held in manner free to slide in a guide-way 137 formed in a frame 138, which is rigidly secured to the carrier. Finger 135 is adapted to engage successively with stepped cams 121 of the indicator-wheels. A spring-pressed arm 139 pivotally sustained at 140 by the carrier and engaged by a spring 141 serves to hold finger 135 and slide 136 normally in position seen in Fig. 11, and restores said parts to said position after each operation. When released, the carrier will be forced forwardly by spring 134, until finger 135 encounters one of the steps of cam 121 of the indicators. A rack-bar 142 is secured to travel with carrier 131. Drive-shaft 117 is provided with a tooth 143 adapted to successively engage the teeth of rack-bar 142, and restore the carrier step-by-step to its normal position. During each revolution of shaft 117, tooth 143 will retract the rack-bar a distance corresponding to one of the teeth of rack-bar 142. During retraction of the rack-bar, a dogging-lever 144 pressed normally into engagement with the rack-bar by a spring 145 will intermittently engage the rack-bar and prevent forward movement thereof. After each forward shift and retraction of carrier 131, finger 135 is shifted laterally to cause the finger to engage the stepped cam 121 of the next indicator-wheel of the series. The lateral shift of the finger is effected by a pawl 148 (see Fig. 7) which is pivotally sustained by arm 150 journaled as at 151 in carrier-frame 138. Slide 136 is provided with a series of teeth or notches 156 wherewith pawl 148 can successively engage to laterally shift the finger-slide step-by-step. Arm 150 is provided with an extension 152 arranged to engage a stationary abutment 153 during the latter part of the retraction of the carrier. A spring 154 presses extension 152 and arm 150 normally towards said abutment and a stop 151' restricts the movement of arm 150 by said spring. A spring 155 presses pawl 148 towards teeth 156. During the forward movement of the carrier 131 and the parts carried thereby, extension 152 of arm 150 will pass out of engagement with abutment 153 and spring 154 engaging said extension will cause the shift of pawl 148 in a direction transverse to the travel of carrier 131, and spring 155 will shift pawl 148 into engagement with the first of the series of teeth 156. While the carrier is being retracted, extension 152 will engage fixed abutment 153 and shift arm 150 and effect a corresponding shift of pawl 148 and the lateral movement of slide 136 and finger 135, so the finger will engage the stepped cam 121 of the succeeding indicator-wheel 27 of the series. A dog 157 is pivotally sustained by the carrier as at 158, and travels back and forth with the carrier. A spring 159 engages dog 157 and tends to force said dog into position to engage a corresponding series of notches or teeth 160 in slide 136, and hold the slide in assigned position after each operation of pawl 148. Such operation is repeated until cam 121 of the last indicator-wheel 25 of the series has been engaged. Pawl 148 and dog 157 are provided respectively with extensions 161 and 162, which engage a slidable releasing-shoe 163. Said shoe is guided laterally by rods 164 and is provided with a stud 165 which is engaged by a cam 166 secured to, and traveling with carrier 131. Cam 166 engages said stud and restricts the inward movement of the shoe, so the shoe will normally engage extensions 161 and 162 of pawl 148 and dog 157 respectively at the end of each operation. A releasing-lever 167 is pivotally sustained at 168 in bracket 31, and causes the shift of the releasing-shoe after the carrier has been operated to effect the transmission of the record of all the indicator-wheels of the series.

A spring 169 tends to hold the releasing-shoe normally in engagement with the free end of lever 167 and a spring 170 Fig. 12 presses said lever normally inward and towards carrier 131. After each initial forward shift of carrier 131, spring 170 shifts releasing-lever 167 and shoe 163 inwardly, and out of the path of movement of extensions 161 162, and to permit the dog to remain in engagement with slide 136 and to permit the pawl to advance said slide step-by-step, and so stud 165 will be out of the path of cam 166. The step-by-step advance of the slide 136 brings finger 135 successively into position to engage each stepped cam 121 of the series. During the last advance of the slide 136, said slide engages lever 167 and forces said lever outwardly against the force of spring 170. This shift of slide 136 occurs during the latter part of the retraction of carrier 131, while stud 165 is adjacent the straight edge 171 of cam 166. Spring 169 permits the releasing-lever to be forced outwardly independently of the releasing-shoe. During the last forward movement of the carrier, and when cam 166 has passed out of engagement with stud 165, spring 169 will cause the releasing-shoe to pass into outward position adjacent the releasing-lever, so that during the latter part of the last retraction of the lever, the releasing-shoe will be in position to be engaged by pawl 148 and dog 157. Upon such release, slide 136 will be restored to normal position in carrier 131 by spring 141 and lever 139, and finger 135 will then be restored to normal position, opposite stepped cam 121 of indicator-wheel 28.

Brake-lever 124 is provided at its free terminal with a spring-pressed hinged member 172, positioned to be engaged by the inner end of slide 136 (see Fig. 7). During the retraction of slide 136, said slide will engage member 172, and shift the brake-lever into position to check further movement of the motor. During each initial forward movement of the carrier, slide 136 will pass out of engagement with the brake-lever, and permit spring 127 to shift brake-lever into position to release the motor. Member 172 is provided with an abutment engaging lever 124, and a spring holds said member normally in the transverse path of movement of slide 136. Said member is pivotally connected to the brake-lever to permit the said slide to travel forwardly and backwardly during the first retraction of the lever without shifting the lever, and until the slide has been advanced laterally in the carrier, a sufficient distance to clear the abutment, during the fore and aft travel of the carrier. During the transverse retractive travel of the slide, the hinged-member of the brake-lever will be engaged by the slide and thus effect shift of the brake-lever into position to stop the motor.

Tooth 143 of shaft 117 has continuous revolution imparted thereto during the operation of the motor, and will impart a step-by-step return movement to rack-bar 142, and carrier 131. The extent of each forward movement of the lever is determined by the position of the stepped-cams and resultantly the retractive steps during each oscillation of the carrier will vary according to the position of the stepped cams and the indicators. During the step-by-step retraction of the carrier, dog 144 will secure the carrier against forward movement, and the teeth of rack 142 are preferably inclined, so that the dog will permit the retraction of the lever by tooth 143. During the latter part of each retraction of the carrier, a stud 173 will engage a detent 174, which serves to hold dog 144 disengaged from the rack-bar, to permit the carrier and finger 135 to travel forwardly until the finger engages a stepped cam 121. Detent 174 is secured to a shaft 175 journaled in frame-member 22 and a bracket 176. Detent 174 is also provided with a cam-surface 177, and a seat 178, adapted to hold a stud 179, secured to dog 144. When stud 173 engages the upper terminal of detent 174, cam-surface 177 will engage stud 179, force said stud and dog 144 downwardly and cause said stud to pass into seat 178. In such position, detent 174 will hold dog 144 disengaged from rack 142. To shaft 175 of detent 174, is secured a trip-arm 180, having its upper terminal extended into the path of a cam 181, secured to drive-shaft 117. Cam 181 engages trip-lever 180, shifts detent 174, which thus rocks shaft 175, and thus effects the release of dog 144 after the rack-bar and carrier have reached the limit of forward movement.

After each operation of the transmitting-mechanism, the several parts will be in normal position shown in Fig. 6. During the last retraction of the carrier, movement of the carrier will be checked before detent 174 has secured dog 144 in position to disengage the dog and rack-bar, so the carrier will be normally held away from the first stepped-cam of the series, to permit revolution of said cam and operation of the register, and so dog 144 may be disengaged from the rack-bar 142 independently of detent 174. Such position of the parts results, because slide 136 is restored to its normal transverse position and shifts the brake-lever 124 before the carrier reaches its extreme rearmost position. The purpose of such construction is to permit dog 144 to be released by mechanism under control of the operator at the reading-station.

The operation of the transmitting-mechanism may be controlled from a distant station, and this controlling-mechanism comprises a magnet 182 (Figs. 2 and 4) interposed in an electric-circuit, and the passage of current over said circuit is controlled by the operator at the distant station. An armature 183 is conveniently suspended as at 184 and provided with an extension 185 positioned to engage an arm 186 secured to shaft 146 whereto dog 144 is secured. When magnet 182 is energized, armature 183 will be attracted, extension 185 will engage arm 186, rock shaft 146 and dog 144 (Fig. 6) and thus release the dog from rack-bar 142. The carrier will then be free to be swung outwardly by spring 134, so a complete operation of the transmitting-mechanism will ensue. To retract the carrier and finger 135, so that the finger will clear the carrier-wheels during the transverse movement of the finger, it is necessary to retract the finger some distance beyond the stepped cams. During such shift of the finger, revolution of the drive-shaft 117 continues. To prevent the completion of the electric circuit by tappet 130 during this extended movement, a stud 187 is secured to and sustained by the carrier (see Figs. 4 and 7). Said stud is arranged to engage a curved terminal 188, of spring contact 129, during the period of the extended movement in which finger 135 is being shifted to clear the stepped cams. During such shift, stud 187 will engage the terminal 188, lift spring-contact 129 out of the path of travel of spring-contact 128. Retraction of the carrier is effected and occurs during that portion of the revolution of shaft 117 in which tappet 130 is out of engagement with spring contact 128, so no electric impulse will pass over the electric-circuit at such time. The carrier is retracted while tooth 143 is out of engagement with rack-bar 142. In order to provide a distinctive signal, which can be clearly distinguished from the pause between the series of impulses for each indicator-wheel, cams 121 are constructed to permit the operation of the signal-device ten times.

The operation of the transmitting-mechanism will be as follows:—Assuming the parts to be in normal position shown in the drawings, and numerals 2, 4, 6, and 8 to be respectively indicated by the indicator-wheels, and it is desired to read the register from a certain station, current will be momentarily impressed into the electric-circuit, in which relay 182 is interposed. Energization of said relay will shift armature 183, arm 186, shaft 146 and effect the disengagement of dog 144 from rack-bar 143. Spring 134 will swing the carrier forwardly until finger 135 encounters stepped cam 121 of indicator-wheel 28. During the forward shift of the carrier, slide 136 will pass out of engagement with hinged-member 172 of brake-lever 124. Brake-lever 124 will then be shifted by spring 127 into position to release stud 126 of the gear-train, and thus cause the motor to drive the entire gear-train connected therewith. Drive-shaft 117 will then revolve, and revolution thereof will continue until the brake-lever is again shifted into position to bring abutment 125 into the path of revolution of stud 126.

The relative position of cam 121 of indicator 28 will be such that the electric-circuit will be completed twice, to send the corresponding number of impulses over the circuit, by shaft 117, and tappet 130, before stud 187 lifts spring-contact 129 out of the range of movement of spring-contact 128. Tooth 143 will intermittently and successively engage the teeth of rack-bar 142 and retract the rack-bar until stud 173 has shifted detent 174 and stud 179 of dog 144 is held in seat 178 of said detent. Dog 144 will then be held in disengaged position, and rack-bar 142 and the carrier will again be free to be shifted forwardly by spring 134.

During the first forward shift of the carrier, cam 166 will be withdrawn from engagement with stud 165, of the releasing-shoe, and spring 170 will shift the releasing-shoe and lever 167 until stud 165 has been shifted inwardly and out of the path of travel of cam 166. The releasing-shoe will then be out of the path of travel of extensions 161 and 162, of pawl 148 and dog 157 respectively, so that said pawl will be free to engage teeth 156 and dog 157 will engage teeth 160 of slide 136 until the releasing-dog is again shifted until the last stroke of each complete operation of the carrier.

During the forward shift of the carrier, shifter-arm 150 will be advanced to move pawl 148 into position to engage the first of the series of teeth 156 of slide 136, as extension 152 of said shifter is withdrawn from engagement with abutment 153. During the retraction of the carrier, extension 152 will encounter abutment 153 and cause the advancement of pawl 148 which will then pass into engagement with the first tooth of slide 136 and effect the advancement of said slide a sufficient extent to bring finger 135 into position to engage the stepped cam 121 of indicator-wheel 27 during the next forward movement of the carrier.

During the next forward shift, finger 125 will engage stepped cam 121 of indicator-wheel 27, which will be in such relative position with respect to said finger, as will permit four revolutions of drive-shaft 117 before stud 187 shifts contact-spring 129 out of the range of travel of contact-spring 128. As a result, four impulses will be sent over the line, indicating to the person at the distant station that the second indicator-wheel indicates the numeral "four". Tooth 143 of drive-shaft 117 will then again retract rack-bar and carrier as heretofore. During such retraction, the circuit will be completed a number of times corresponding to the number indicated by the indicator-wheel 27 and pawl 148 will again advance slide 136 and finger 135 until the finger is properly positioned to engage the stepped cam 121, of indicator-wheel 26. After a number of impulses corresponding to the record of wheel 27 have been transmitted, detent 174 will again disengage dog 144 from rack-bar 142 and permit the carrier to be again shifted forwardly as before. During this forward shift, finger 135 will encounter stepped cam 121 of indicator-wheel 26. The carrier will again be retracted as heretofore, by tooth 143 and the number of impulses corresponding to the number indicated by the indicator-wheel 26, will be transmitted over the line. At the end of this retractive movement of the carrier, the slide will be again advanced as heretofore, and dog 144 will be disengaged from rack-bar 142.

During the last transverse advance of slide 136 said slide will engage releasing-lever 167, and shift said lever outwardly. Releasing-shoe 163 will be momentarily detained by cam 166 until the carrier has moved forward sufficiently to withdraw cam 166 away from stud 165 of the releasing-shoe. Said shoe will then be drawn towards said lever by spring 169 and will then be in position to engage pawl 148, and dog 157 and effect their disengagement from slide 136, during the latter part of the last retractive movement of the carrier. Tooth 143 will again retract the rack-bar and carrier as heretofore, and during such retraction, a number of impulses will be transmitted corresponding with the number indicated by the indicator-wheel 25.

During the latter part of the last retraction of the carrier, pawl 148 and dog 157 will encounter releasing-shoe 163, which will withdraw these parts from engagement with slide 136, and permit such slide to be shifted transversely to normal position. Such shift of the slide will bring the slide into engagement with the hinged member 172 of the brake-lever and shift the brake-lever into position to positively stop further revolution of the motor. The releasing-shoe is positioned to effect the return of the slide to normal position, and the stopping of the motor before detent 174 releases dog 144 from engagement with rack-bar 142 during the last stroke of carrier 131, of each operation. The rack-bar will thus be held against forward movement by said dog, while the mechanism is in normal position. The detent being disengaged from dog, permits the independent shift thereof by the releasing-mechanism under control of the operator at the distant station.

It will be observed that when the transmitting-mechanism is operated to transmit the record of the register to a distant station or office, the indicator-wheels are not disturbed, so that if desired, the transmitting-mechanism may be operated at any desired time, and furthermore, can be repeatedly operated in event the reading is not correctly taken the first time, or whenever it is desired to verify a reading. Such feature is important, because the record of the register is always maintained and can always be verified and results from employing a transmitting-mechanism which can be operated independently of the register. The motor for the transmitting-mechanism is wound, while the register is being operated, and when the motor has been sufficiently wound to operate the transmitting-mechanism, a desired number of times, the further winding of the motor is automatically discontinued.

In Fig. 14 of the drawings, the invention is shown as associated with a telephone-system. 200 denotes a spring-jack of a switch-board at the central-exchange, 201 a line-signal, 203, 203' branch-conductors extending between the central office and the substation. The substation is shown as provided with a telephone-set 204 of usual arrangement and construction. Conductor 203 is connected with a branch-conductor 199, which terminates in a contact adapted to be engaged by a bridge-plate 205 secured to the switch-hook and insulated therefrom. A conductor 206 extends from a terminal engaged by a bridge 205, when the telephone is out of use, and to controlling-relay 182, of the transmitting-mechanism. A conductor 211 extends from said relay to ground. Contact-spring 129 of the transmitting mechanism is connected by conductor 209 with conductor 203 and spring 128 is connected by a conductor 210 with the other branch 203' of the telephone-line. Contact-spring 80 is connected by conductor 208 with one of the conductors of the telephone-line, and contact-spring 81 is connected with conductor 207 in which relay 79 is included and conductor 211 connects said relay with ground.

At the central-station, a key-switch comprising springs 218 and 219, is included in the usual conductors 212 of a cord-loop, which terminates in a switch-plug 213. One side of a battery 215 is connected by conductor 214, with a contact-terminal adjacent spring 218, and the other side of the battery is connected by conductor 220 with a contact-terminal adjacent spring 219 of the key-switch. Battery 215 is also connected with ground. A signaling-device, e. g., a bell or a lamp, 216 is included in a local circuit 217, and a repeating-coil 221 transfers electrical impulses from conductor 214 to said local circuit.

When the central operator desires to operate the transmitting-mechanism, to ascertain the record indicated by the register at a substation, the operator will insert plug 213 into spring-jack 200, and shift the key-switch of the cord-loop. Thereupon a circuit for the passage of current will be established as follows, viz: battery 215, conductor 214, spring 218, the sleeve of plug 213, line-conductor 203, conductor 199, bridge 205 (the switch-hook being then in lowest position), conductor 206 relay-coil 182, and conductor 211 to ground. Coil 182 will then be energized and effect the release of the transmitting-mechanism as hereinbefore described.

When the transmitting-mechanism is in operation a circuit will be intermittently completed by springs 128 129, in accordance with the record indicated by the register and as hereinbefore described. Such circuit will be as follows, viz; battery 215, conductor 214, spring 218 of the key-switch at the central-office, the sleeve of plug 213, one of the springs of jack 200, line-conductor 203, branch-conductor 209, springs 129 and 128, of the transmitting-mechanism, conductor 210, line-conductor 203', the other spring of jack 200, the tip of plug 213, spring 219 of the key-switch and conductor 220 back to battery 215. Electrical impulses corresponding to those transmitted over said circuit will be transferred to local circuit 217 and effect a corresponding actuation of signal 216.

It is to be understood that the improved transmitting-mechanism may be used to advantage in any instance where it is desired to obtain a reading of the register from a distant station and that the invention is not necessarily restricted to a telephone-system, unless specifically defined in the claims.

Manifestly, the several features of the invention may be employed severally without adoption in entirety and furthermore, the invention is not to be understood as restricted to the construction shown and described, but can be modified within wide limits without departing from the spirit of the invention.

Having thus described my invention, what I claim as new and desire to secure by Letters Patent, is:

1. In a recorder system, the combination of a register, means for registering thereon by unit tallies, associated means for registering definite groups of unit tallies in units of higher denominations, means for taking a reading of the accumulated tallies in groups of units, one group for each denomination, an associated transmitting mechanism, and an electric circuit over which said reading is sent by the transmitting mechanism.

2. In a recorder system, the combination of a register, means for registering thereon by unit tallies, associated means for registering definite groups of unit tallies in units of higher denominations, means for taking a reading of the accumulated tallies in groups of units, one group for each denomination, and means for electrically transmitting the reading to a central office.

3. In a recorder system, the combination of a register, means for registering thereon by unit tallies, associated means for registering definite groups of unit tallies in units of higher denominations, means for taking a reading of the accumulated tallies in groups of units one group for each denomination, means for electrically transmitting the same to a central office, and controlling-means for the reading means operative from the central office.

4. In a recorder system, the combination of a register, means for registering thereon by unit tallies, associated means for registering definite groups of unit tallies in units of higher denominations, means for taking a reading of the accumulated tallies in groups of units, one group for each denomination, an associated transmitting mechanism, an electric circuit over which said reading is sent by the transmitting mechanism to a central office, and controlling means for the reading-means operative from the central office.

5. In a recording system for telephone service, the combination of a register at the sub-station, an electrically actuated responsive device at the central office whereby reading of the subscriber's register may be received intelligibly, an electric circuit including said responsive device, means for taking a reading of said register and transmitting such reading to said responsive device without resetting the register and means, controlled from the central office, for controlling the operating of the transmitting and reading means.

6. In a recorder system for telephone systems, the combination of a register, means for registering thereon by unit tallies, associated means for registering different groups of unit tallies in units of higher denominations, means for taking a reading of the accumulated tallies in groups of units one group for each denomination without destroying the recorded total, an associated transmitting-mechanism, and an electric circuit over which said reading is sent by the transmitting-mechanism.

7. In a recorder for telephone service, the combination of a register at the subscriber's station, an electrically actuated device at the central office, electrical connections between said device and the register, transmitting mechanism and means controlled solely from the central office, whereby the number indicated on the register may be transmitted to said device at the central office without resetting the register.

8. In a recorder apparatus for telephone service, the combination of a register at the sub-station, means for accumulating tallies thereon one by one, transmitting mechanism associated with said apparatus and including an electric circuit to a central office, means for operating said transmitting mechanism to transmit an accumulation of such tallies to the central office without destroying the recorded total, and controlling-means for the transmitting mechanism operable from the central office.

9. In a recording apparatus for telephone service, the combination of means for accumulating a record of tallies one by one, transmitting mechanism associated with said apparatus and including an electric circuit extending to a central office, means whereby a given accumulation of tallies can be repeatedly transmitted and controlling means for the transmitting mechanism, operable from the central office.

10. In a recording apparatus for telephone service, the combination of means for accumulating a record of tallies one by one, transmitting mechanism associated with said apparatus and including an electric circuit extending to a central office, means whereby a given accumulation of tallies can be repeatedly transmitted without destroying the recorded total and controlling-means for the transmitting mechanism operable from the central office.

11. The combination with a register, of mechanism for transmitting the record indicated by the register so the record indication can be transferred over a connecting line to a distant station, and a cam secured to the register and for determining the operation of said mechanism to correspond with the register.

12. The combination with a register, of mechanism for transmitting the record indicated by the register so the record indication can be transferred over a connecting line to a distant station, a motor operating said mechanism, and a cam connected to the register and for determining the operation of said mechanism to correspond with the register.

13. The combination with a register comprising a plurality of indicators for different denominations, of mechanism for taking a reading of the register, an electric circuit over which said reading is sent by said mechanism; and means for causing the operation of said mechanism to successively transmit the record of each of the indicators.

14. The combination with a register comprising a plurality of indicators for different denominations, of mechanism for taking a reading of the register, an electric circuit over which said reading is sent by said mechanism; a spring motor for operating said mechanism and means for causing the operation of said mechanism to successively transmit the record of each of the indicators.

15. The combination with a register comprising a plurality of indicators for different denominations, of a mechanism for transmitting the indication of the register; said mechanism comprising a cam for each of said indicators and operated by the indicators respectively therewith, said transmitting-mechanism being operated independently of said cams so the record of the indicators may be repeatedly transferred without destroying the record of the indicators.

16. The combination of a register comprising a plurality of indicators for different denominations, a step-by-step advancing mechanism for the register, mechanism for transmitting the indication of the register over an electric circuit, a spring-motor for imparting movement to the transmitting-mechanism and operated by said step-by-step advancing means, and means for automatically disconnecting said motor from the advancing-means when sufficient power has been stored in the motor to effect the operation of the transmitting-mechanism.

17. In a recorder system for telephone service, the combination of a register comprising a plurality of indicators for different denominations, means for advancing the register step-by-step, a device for producing an audible signal to notify the central station of the operation of the register, mechanism for successively transmitting the indication of each of the indicators to the central office, and an electric circuit over which the indications are transmitted to the central office.

18. In a recorder system for telephone service, the combination with a register comprising a plurality of indicators for different denominations, of mechanism at the registering station for transmitting a reading of the register to a central office, and an electric circuit between said station and the central office; means for causing the operation of said mechanism to successively transmit the indication of each of the indicators over said circuit to the central office.

19. In a recorder system for telephone service, the combination with a register comprising a plurality of indicators for different denominations, of mechanism at the registering station for transmitting a reading of the register to a central office, an electric circuit between said station and the central office; means for causing the operation of said mechanism to successively transmit the indication of each of the indicators over said circuit to the central office, and controlling means for the transmitting mechanism operable from the central office.

20. In a recorder system for telephone service, the combination of a register at a sub-station, a device for producing an audible signal, means for operating said signal-device to indicate the accumulated registrations indicated by the register, and means for transmitting the audible signals thus produced to a central office.

21. In a recorder system for telephone service, the combination of a register at a sub-station a device for producing an audible signal, means for operating said signal-device to indicate the accumulated registrations indicated by the register, means for transmitting the audible signals thus produced to a central office, and controlling-means for the transmitting-means operable from the central office.

22. In a recorder system for telephone service, the combination of a register, means for registering thereon by unit tallies, associated means for registering definite groups of unit tallies in units of higher denominations, a device for producing an audible signal, means for operating said device to indicate the accumulated tallies in groups of units, and means for transmitting the signals to a central office.

EDWARD P. BAIRD.

In presence of—
 FRED GERLACH,
 EMMA GERLACH.